United States Patent
Brewer et al.

(10) Patent No.: US 6,999,411 B1
(45) Date of Patent: Feb. 14, 2006

(54) SYSTEM AND METHOD FOR ROUTER ARBITER PROTECTION SWITCHING

(75) Inventors: Tony M. Brewer, Plano, TX (US); Gregory S. Palmer, Plano, TX (US); Keith W. Shaw, Plano, TX (US)

(73) Assignee: Chiaro Networks, Ltd., Richardson, TX (US)

( * ) Notice: Subject to any disclaimer, the term of this patent is extended or adjusted under 35 U.S.C. 154(b) by 825 days.

(21) Appl. No.: 09/760,027

(22) Filed: Jan. 12, 2001

(51) Int. Cl.
    *G01R 11/08* (2006.01)
(52) U.S. Cl. .................. 370/220; 370/221; 370/461; 398/2; 398/6; 398/10
(58) Field of Classification Search ........ 370/216–217, 370/219–220, 244; 455/8; 398/1, 2, 5; 714/2
See application file for complete search history.

(56) References Cited

U.S. PATENT DOCUMENTS

| 4,393,493 | A  | * | 7/1983  | Edwards ............... 370/228 |
| 4,497,054 | A  | * | 1/1985  | Read .................. 370/220 |
| 5,936,938 | A  | * | 8/1999  | Weldon et al. ........ 370/228 |
| 6,442,133 | B1 | * | 8/2002  | Owada ................ 370/219 |
| 6,535,479 | B1 | * | 3/2003  | Ikematsu ............. 370/220 |
| 6,621,788 | B1 | * | 9/2003  | Terasaki ............. 370/220 |
| 6,661,786 | B1 | * | 12/2003 | Abbiate et al. ....... 370/386 |
| 6,711,357 | B1 | * | 3/2004  | Brewer et al. ........ 398/54  |
| 6,735,197 | B1 | * | 5/2004  | Duschatko et al. ..... 370/386 |

OTHER PUBLICATIONS

U.S. Appl. No. 09/703,057, filed Oct. 31, 2000, T. M. Brewer et al.
U.S. Appl. No. 09/703,038, filed Oct. 31, 2000, T. M. Brewer et al.
U.S. Appl. No. 09/703,056, filed Oct. 31, 2000, T. M. Brewer et al.
U.S. Appl. No. 09/703,027, filed Oct. 31, 2000, H. C. Blackmon et al.
U.S. Appl. No. 09/703,043, filed Oct. 31, 2000, H. C. Blackmon et al.
U.S. Appl. No. 09/703,064, filed Oct. 31, 2000, T. C. McDermott, III, et al.

\* cited by examiner

*Primary Examiner*—Brian Nguyen
*Assistant Examiner*—Tri H. Phan
(74) *Attorney, Agent, or Firm*—Fulbright&Jaworski LLP

(57) ABSTRACT

In a router with redundant central arbiters, a set of control processors (CPs) determines which arbiter is active, which is standby, and when to switch between them. In normal operation ingress ASICs issue requests to the active central arbiter ASIC and keep-alive requests cyclically once per chunk period to the passive arbiter ASIC, which then returns keep-alive grants through the same links to the ingress ASICs and sends standby configuration information to the optical switch ASICs. The arbiter ASICs pass a switch-over decision simultaneously to the optical switch ASICs and ingress ASICs, which empty all queues of outstanding requests, and then resend all of those requests to the new active central arbiter after all queues are empty, such that no router traffic is lost. Mechanisms ensure that during the transition the ASICs properly recognize which data links are healthy and which arbiter is active.

12 Claims, 2 Drawing Sheets

SYSTEM AND METHOD FOR ROUTER ARBITER PROTECTION SWITCHING

RELATED APPLICATIONS

This application is related to co-pending and commonly assigned U.S. application Ser. No. 09/703,057, entitled "System And Method For IP Router With an Optical Core," to co-pending and commonly assigned U.S. application Ser. No. 09/703,056, entitled "System and Method for Router Central Arbitration," to co-pending and commonly assigned U.S. application Ser. No. 09/703,038, entitled "System and Method for Router Data Aggregation and Delivery," to co-pending and commonly assigned U.S. application Ser. No. 09/702,958, entitled "Timing and Synchronization for an IP Router Using an Optical Switch," issued Mar. 23, 2004 as U.S. Pat. No. 6,711,357, to co-pending and commonly assigned U.S. application Ser. No. 09/703,027, entitled "Router Network Protection Using Multiple Facility Interfaces," to and commonly assigned U.S. application Ser. No. 09/703,043, entitled "Router Line Card Protection Using One-for-N Redundancy" issued as U.S. Pat. No. 6,879,559 on Apr. 12, 2005, and to commonly assigned U.S. application Ser. No. 09/703,064, entitled "Router Switch Fabric Protection Using Forward Error Correction," issued as U.S. Pat. No. 6,894,907 on May 17, 2005, all filed Oct. 31, 2000, the disclosures of which are incorporated herein by reference.

TECHNICAL FIELD

This application relates to the field of optical communication networks, and particularly to large-scale routers for optical communication networks.

BACKGROUND

A large router system has redundant arbitration fabric elements contained in working and standby central arbiter shelves. Each redundant arbiter shelf contains a central arbiter and multiple arbiter interfaces module. When one central arbiter fails, responsibility must switch over to the other arbiter in such a fashion that the entire system recognizes the switch-over, starts listening to the now current active arbiter, and no longer listens to the now standby arbiter. This transition has to be done in such a fashion that the entire system does not become confused. Furthermore, in a system having redundant central arbiter shelves, it is necessary that the standby arbiter shelf is functioning properly, that no links have become inoperable, and that the arbiter ASICs themselves are performing properly.

SUMMARY OF THE INVENTION

The present invention is directed to a system and method in which a router with redundant central arbiter shelves contains a set of control processors (CPs) that determines which central arbiter shelf is active. The CPs look at the alarms of the system and determines based on those alarms whether to switch central arbiter shelves. In one central arbiter shelf the CARB or central arbiter ASIC is designated as active. In the redundant central arbiter shelf, the central arbiter ASIC is designated as the standby central arbiter.

In normal operation ingress ASICs in the packet forwarding modules (PFMs) send requests to the active central arbiter ASIC to pass chunks of information through an optical switch module. Requests are received from all the multiple ingress ASICs in the system on each chunk cycle. The active central arbiter ASIC determines which requests during each chunk period to send on through multiple links to the optical switch ASICs to configure the optical switch modules. For requests that have been selected, corresponding grants are issued from the active central arbiter ASIC back to the originating ingress ASIC.

During normal operation one request at a time is issued from an originating ingress ASIC of a packet forwarding module (PFM) to the standby central arbiter ASIC, and the destination for that request is the same originating ingress ASIC source. Therefore, the destination will always be in the system, and when a grant for that request is returned through the standby link to the originating ingress ASIC, the grant is compared with the expected results to confirm proper formatting with proper information. Once that request/grant cycle is completed, another single request is issued and its grant subsequently received. This keep-alive traffic continues cyclically, ensuring that the standby link is in condition to become the active link. Additionally, a known pattern is transmitted across the links between the standby central arbiter ASIC and the optical switch ASIC, which has the normal arbitration optical switch configuration information. This configuration information is a known pattern on the standby links, which can be monitored to verify that the known pattern is being properly transmitted.

When the CPs deem it an appropriate time to make the switch-over, they write a CSR in the current active CARB and set it to standby, and then go to the other central arbiter shelf and write a CSR that changes its mode from standby to active, thereby reversing, i.e., toggling those particular bits within the central arbiter ASICs.

The central arbiter ASICs pass the switch-over decision simultaneously to the optical switch ASICs and back through the arbiter interface ASICs to the ingress ASICs, so that they all recognize the transition from active to standby of one arbiter and from standby to active of the other arbiter, and properly issue requests and listen for grants on the now new active central arbiter and send keep-alive traffic to the new standby central arbiter. During this switch-over process, it is possible that each ingress ASIC and optical switch ASIC interpret that both of the arbiter shelves are simultaneously either in the active mode or in the standby mode, due to the time lag between setting the CSR bits in the central arbiter ASICs and communication of the switch-over to the ingress and optical switch ASICs. During this delay time, the ingress ASICs and the optical switch ASICs properly follow the active-to-standby transition, such that all of the optical switch ASICs and all of the ingress ASICs recognize which is the new active central arbiter shelf during the same chunk period.

The links from the ingress ASICs to the arbiter interface ASICs are optical links, having an expected bit error rate. A cyclical redundancy check (CRC) is used to check the validity of the information flowing across the link. An invalid packet of information, either a request going to the arbiter or an invalid grant coming back, will be dropped if an invalid CRC is detected. The ingress ASIC has a timeout mechanism, such that if a request is issued but the grant is not returned within a period of time, then the timeout will expire, the ingress ASIC will assume that the request information did not reach the arbiter or that the grant did not get back, and the information will be resent. This resend mechanism is used during the switch-over process to completely flush out all requests in the central arbiter, such that the ingress ASIC and the central arbiter both observe that no requests are pending in the central arbiter and thus that the central arbiter and the ingress ASIC are synchronized and ready to begin new request and grant sequencing.

Various aspects of the invention are described in co-pending and commonly assigned U.S. application Ser. No. 09/703,057, entitled "System And Method For IP Router With an Optical Core," co-pending and commonly assigned U.S. application Ser. No. 09/703,056, entitled "System and Method for Router Central Arbitration," co-pending and commonly assigned U.S. application Ser. No. 09/703,038, entitled "System and Method for Router Data Aggregation and Delivery," and commonly assigned U.S. application Ser. No. 09/702,958, entitled "Timing and Synchronization for an IP Router Using an Optical Switch," issued Mar. 23, 2004 as U.S. Pat. No. 6,711,357, co-pending and commonly assigned U.S. application Ser. No. 09/703,087, entitled "Router Network Protection Using Multiple Facility Interfaces," and commonly-assigned U.S. application Ser. No. 09/703,043, issued as U.S. Pat. No. 6,879,559 on Apr. 12, 2005, entitled "Router Line Card Protection Using One-for-N Redundancy" and commonly assigned U.S. application Ser. No. 09/703,064, entitled "Router Switch Fabric Protection Using Forward Error Correction," issued as U.S. Pat. No. 6,894,907 on May 17, 2005, all filed Oct. 31, 2000, the disclosures of which are incorporated herein by reference.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 1:
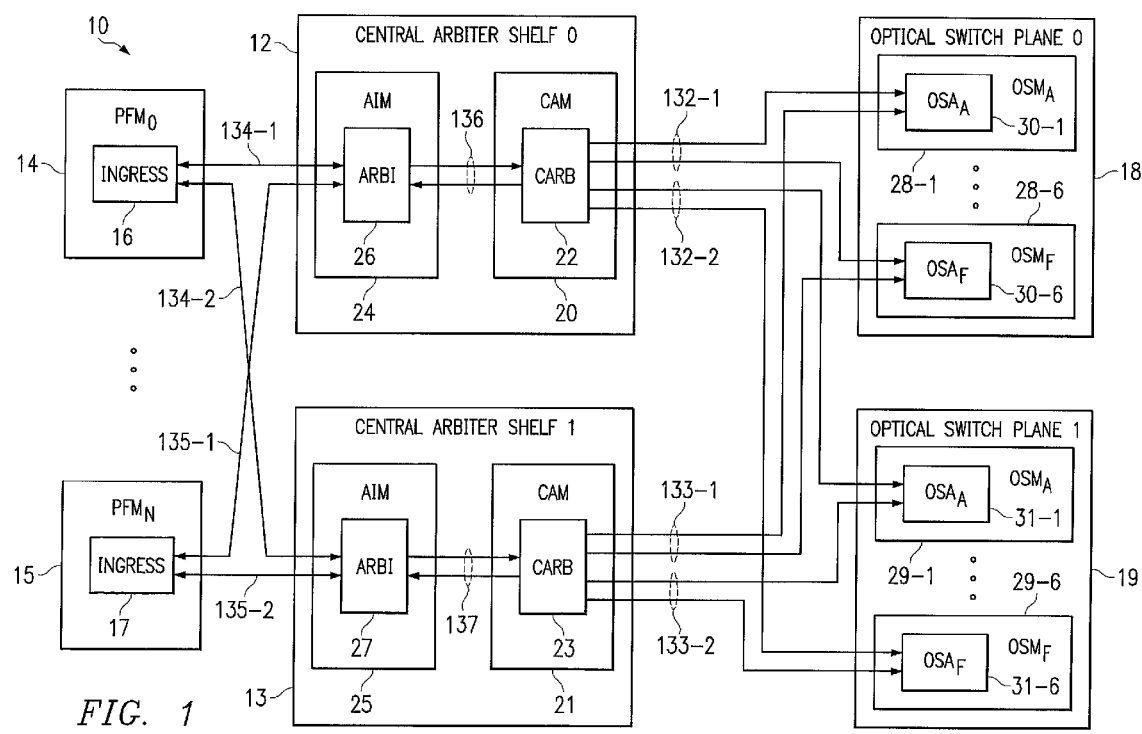
FIG. 1 is a block diagram illustrating the flow of requests and grants between packet forwarding modules and the central arbiter and the flow of configuration information from the central arbiters to the optical switch planes.

FIG. 1 is a block diagram illustrating the flow of requests and grants between packet forwarding modules and the central arbiter and the flow of configuration information from the central arbiters to an optical switch fabric to prepare the optical switch planes properly for the next information chunk in a network router system (see U.S. application Ser. No. 09/703,057 and U.S. application Ser. No. 09/703,056, both cited above). In FIG. 1, each of N packet forwarding modules represented by PFMs 14 and 15 contains an ingress ASIC represented by ASICs 16, 17, as well as other ASICS (not shown in FIG. 1). Ingress ASIC 16, 17 requests grants through arbiter interface modules (AIMs) 24 and 25 located within respective central arbiter shelves 12 and 13, designated as shelf 0 and shelf 1. Each AIM 24, 25 contains an Arbiter Interface ASIC 26, 27 (ARBI) which is connected to a central arbiter module (CAM) 20, 21 through respective links 136 and 137. CAMs 20 and 21 each contain a respective central arbiter ASIC (CARB) 22 and 23. CAMs 20 and 21 communicate configuration information to optical switch modules 28-1 through 28-6 and 29-1 through 29-6 through respective optical links 132 and 133. An optical switch fabric contains optical switch modules 28-1 through 28-6 and 29-1 through 29-6 organized into two optical switch planes 18 and 19, designated as plane 0 and plane 1, each containing six optical switch modules, each such switch module containing a respective optical switch ASIC 30-1 through 30-6 and 31-1 through 31-6.

In normal operation PFMs 14, 15 send requests to pass a chunk of information through an optical switch module 28-1 through 28-6, 29-1 through 29-6. The request is issued from ingress ASIC 16, 17 through links 134-1 and 135-1, to central arbiter shelf 12. Normally one of the two arbiter shelves 12 and 13 is in the active state and the other shelf is in the standby state. If the requests are sent through links 134-1 and 135-1, then central arbiter shelf 12 is in the active state. When a request reaches arbiter interface ASIC 26, the request is then forwarded through links 136 to central arbiter ASIC 22. Requests are received from all the multiple ingress ASICs in the system on each chunk cycle. Active central arbiter ASIC 22 determines which requests during each chunk period to send on through multiple links 132-1, 132-2 to optical switch ASICs 30-1 through 30-6 and 31-1 through 31-6 to configure the optical switch modules 28-1 through 28-6 and 29-1 through 29-6. For requests that have been selected, corresponding grants are issued from active central arbiter ASIC 22 back through the reverse path through links 136 back to arbiter interface ASIC 26 and from there to ingress ASICs 16 and 17 through respective links 134-1 and 135-1.

With respect to standby arbiter shelf 13, similar operations occur, except that the requests are predetermined requests used only as keep-alive traffic. A request is sent through links 134-2 and 135-2 with a predetermined source and destination address, which are those of the respective source, for example PFM 14 or 15, to ARBI ASIC 27 in standby arbiter shelf 13 and from there to standby central arbiter ASIC 23 through links 137. Keep-alive grants in response to these keep-alive requests are then returned through links 137 and ARBI 27 and from there back through links 134-2 and 135-2. Ingress ASIC 16, 17 then examines the return keep-alive grant and verifies that it contains the proper information, and then issues a new keep-alive request to standby central arbiter 23. Standby central arbiter 23 performs the normal functions of granting those keep-alive requests and also sending standby configuration information through links 133 to optical switch ASICs 30-1 through 30-6 and 31-1 through 31-6, where it is recognized as standby configuration information. The optical switch ASICs simply monitor that information, ensuring that the proper sequence of connections to the optical switch module is being received and that links 133 would operate properly if transitioned to the active mode.

Links 134-1, 134-2, 135-1, and 135-2 each have a non-zero bit error rate. The data on these links are verified using cyclical redundancy check (CRC) information. If a request or grant flowing through those links has an error in the packet, such that the CRC is calculated as being in error, then that request or the grant is dropped at the destination, for example the optical switch ASIC or the ingress ASIC, and the ingress ASIC will determine later that a request that is sent out did not receive a grant within a predetermined timeout period (see U.S. application Ser. No. 09/703,056, cited above). When that occurs, the ingress ASIC resets its own internal outstanding request queue as well as the central arbiter*'s request queues, so that the ingress ASIC and the central arbiter ASIC for that particular port are again synchronized, i.e., both ASICs observe that there are no outstanding requests to the central arbiter. The ingress ASIC then reissues all of the requests that were previously outstanding to the central arbiter and proceeds with normal operation. There is normally a short delay of only a few chunk periods during which the central arbiter does not have any requests to process. Accordingly, some minimal and infrequent loss of performance occurs.

Figure 2:
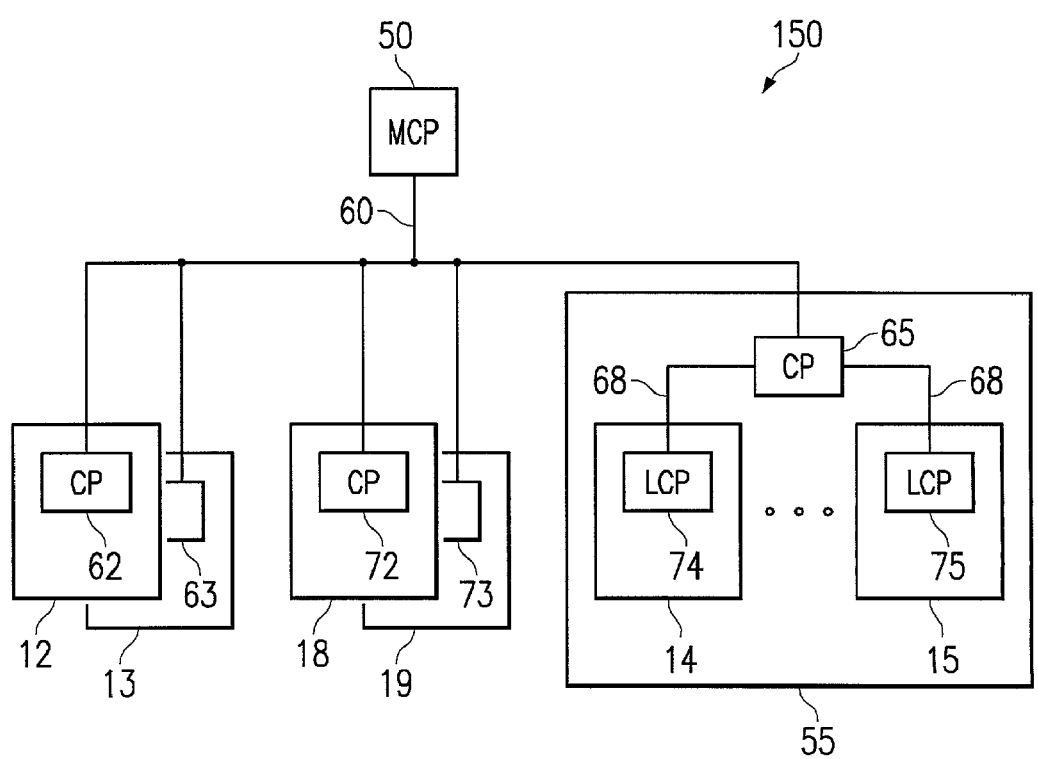
FIG. 2 is a simplified schematic diagram showing a master control processor 50 interconnected with a portion of a router system through control network.

FIG. 2 is a simplified schematic diagram showing a master control processor (MCP) 50 interconnected with a portion of a router system 150 through control network (CNET) links 60, which communicates with all control processors (CPs) in each of the shelves of router system 150. In some embodiments there are redundant active and standby MCPs and other control processors, with redundant CNET links. However, for ease of understanding only a single control network having a single MCP and other control processors is shown in FIG. 2. There are three categories of shelves in router system 150, including arbiter shelves 12 and 13, optical switch plane shelves 18 and 19, and line shelves 55. In arbiter shelves 12, 13 CPs 62 and 63 are interconnected through CNET links 60 with MCP 50. Similarly, control processors 72 and 73 in optical switch shelves 18, 19 communicate with MCP 50 through CNET links 60. Shelf control processors 62, 63, 72, and 73, whether in arbiter shelves 12, 13 or optical switch shelves 18, 19, control all of the modules within those respective shelves. All other modules, whether CAM, AIM or OSM, are passive as far as the control process is concerned, and all activity is done via reading and writing control and status registers (CSRs) on those other modules. Links between control processors 62, 63 or 72, 73 and the other modules within their respective shelves are high speed communication links that apply control and status checks to reads and writes. Control processors within arbiter shelves 12, 13 and optical switch shelves 18, 19, respectively, initialize the modules and monitor the modules on those shelves using CSR reads and writes, and receive interrupts if an alarm occurs for which some action must be taken.

Line shelf 55 includes a control processor 65, which manages the other modules within line shelf 55, including packet forwarding modules 14 through 15. Packet forwarding modules 14, 15 perform sufficient functions that they each contain a dedicated local control processor (LCP) 74, 75 respectively, which communicate with CP 65 through links 68. LCPs 74, 75 are each responsible for managing the PFM on which the LCP resides, as well as the facility modules directly connected to that PFM. The LCP of a PFM is responsible for initialization of that PFM and associated facility modules, as well as performing monitoring and alarm status for those modules.

Referring again to FIG. 1, links 134 and 135 have a status associated with them as observed by respective ingress ASICs 16, 17. The status is determined by whether information is being properly sent and received through that link. The destination of the link inspects the information being received and, if it determines that the packet is properly received and that the CRC has been properly verified, then the status of that link is healthy, and information on the link can be used to determine requests and grants. If the link is not healthy, it is in a weak state in which case no information is being received, or else information that is being received has poor integrity and cannot be used. The healthy versus weak status of the link is used to determine which central arbiter to designate as active or standby.

There is one bit in each central arbiter ASIC that is accessed by a CSR request, which specifies from the CPs which central arbiter is active and which central arbiter is standby. The determination can be forced by the MCP, or selected automatically by the distributed CPs using system status information. The central arbiter communicates its active/standby bit through the grant path through links 136 and 137 and through the ARBIs, and then back through links 134 and 135 to the ingress ASICs. That bit of information stating standby or active is also communicated across links 132 and 133 to optical switch ASICs 30 and 31. The ingress ASICs and optical switch ASICs use the active/standby bit in these links together with the healthy/weak status of the links in order to determine which central arbiter should be recognized as the active arbiter and which should be recognized as the standby arbiter.

The ingress ASICs and the optical switch ASICs each make a decision on the same chunk period of which information should propagate out to optical switch ASICs and ingress ASICs. They each decide on every chunk period which input link should be considered for active use and which considered for standby use. Table 1 indicates which arbiter is considered active for the next chunk period based on the present link status and on which arbiter is currently active. In Table 1 the first two columns labeled arbiter shelf 0 link status and arbiter shelf 1 link status contain entries showing the respective individual link status. If the link is healthy, then information within the packet is examined that specifies whether that particular link is intended to be active or standby. If the link status is weak, then the information within the packet cannot be obtained, and it is unknown whether that link is intended to be active or standby. The third column lists the Active Shelf Present Chunk Period State and the fourth column shows the Active Shelf Next Chunk Period State. The first row entry shows that the link coming from arbiter shelf zero is healthy and indicating an active status, and accordingly should be recognized as the active link. When that is the status of link zero, and when the present state indicates that link zero should be used as the active shelf, then independent of the status of link one, shelf zero will remain the recognized active shelf.

Table 1 can be summarized with a set of rules, namely (1) if only one link is reporting a healthy status to be used as active, then that link is recognized as the active arbiter interface; (2) if only one link is reporting healthy and standby status, then the other link is recognized as the active central arbiter link. Thus the weak link, although information is not able to be sent or received, is still considered the active link, and ingress ASIC 16, 17 is unable to participate in sending requests and receiving grants from the active central arbiter until the CPs at some point in time determine that it is appropriate to switch over; and (3) if both links are reporting the same link status, then no changes are made to the active or standby interpretation.

Accordingly, if links from both arbiter shelf zero and arbiter shelf one report healthy and active status, for example during a transition state switching from one to the other, then the active link is considered to remain the same. Similarly, if both links are healthy and standby, again the present interpretation of active and standby links is not changed. If both links are weak, then although there can be no communication with either central arbiter, the present interpretation as to which is standby and which is active is not changed.

TABLE 1

| Arbiter Shelf 0 Link Status | Arbiter Shelf 1 Link Status | Active Shelf Present Chunk Period | Active Shelf Next Chunk Period |
|---|---|---|---|
| Healthy/Active | Don't Care | 0 | 0 |
| Healthy/Active | Healthy/Active | 1 | 1 |
| Healthy/Active | Healthy/Standby | Don't Care | 0 |
| Healthy/Active | Weak | Don't Care | 0 |
| Healthy/Standby | Healthy/Active | Don't Care | 1 |
| Healthy/Standby | Healthy/Standby | 0 | 0 |
| Healthy/Standby | Healthy/Standby | 1 | 1 |
| Healthy/Standby | Weak | Don't Care | 1 |
| Weak | Healthy/Active | Don't Care | 0 |
| Weak | Healthy/Standby | Don't Care | 0 |
| Weak | Weak | 0 | 0 |
| Weak | Weak | 1 | 1 |

When the ingress ASICs determine that a switch-over from shelf zero to shelf one is to occur, they must then issue a reset on the active and standby central arbiters as well as the ingress ASICs request queues, in order to synchronize the state on both the central arbiters and the ingress ASICs to the empty state. After this, the requests are sent to the new active arbiter shelf, and the standby shelf is used for keep-alive traffic. Similarly, on the optical switch ASIC when a switch-over occurs, the optical switch ASIC from then on recognizes only to the new active link to configure the optical switch and uses the new standby link for monitoring for future decisions on whether a failure has occurred.

In normal operation, if a central arbiter needs to be taken out of service, then the CPs write a CSR to the current active central arbiter, setting it to standby and to the current standby central arbiter, setting it to active, essentially toggling that bit in each of the central arbiters. That bit then propagates out through the interface to the optical switch ASICs and simultaneously to the ingress ASICs. The ingress ASICs determine on the very same chunk period that the healthy active went to healthy standby links, and the link that was healthy standby before went to healthy active. They then resets their queues, both in the ingress ASICs and in the central arbiter itself so that they are synchronized to the empty state. Then the ingress ASICs start sending requests to the newly-designated active central arbiter and getting grants back, with corresponding configuration information going from the new active arbiter to the optical switch ASIC to reconfigure the optical switch module. While the reset is occurring, there is a short break in the flow of grants that come back to the ingress ASIC, during which no data chunk is sent to the optical switch module. Thus, there is a short period of time when data traffic is interrupted and not dropped, but rather held in queues in the PFM until information is resent.

Another scenario occurs when one of the arbiter interfaces, or a link itself, or the central arbiter fails, such that the exact location of the failure is unknown. The failure manifests itself as a failure on the link, either because the link itself is unable to communicate or because, for example, an ARBI is unable to communicate with its central arbiter ASIC. That lack of communication between those two ASICs is passed through links 134 and 135 back to the ingress ASICs, indicating an inability to communicate somewhere in the path to the central arbiter. Consequently, that link is designated as weak, regardless of whether the particular link itself is unable to communicate or whether the links between the ARBI interface and the CARB are unable to communicate. Once a failure is detected, the information is then used by the CPs to determine whether to switch over, in which case they again toggle the bits. In a failure scenario, the ingress ASIC and the optical switch ASIC each typically have one weak link and one healthy link. The healthy link then transitions from the standby mode to active mode, and the weak link remains weak. Because the healthy link went from standby mode to active mode, it is then recognized as the active arbiter link, and the transition occurs as described above.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of protection switching of redundant central arbiters in a router system, comprising:

selecting an active central arbiter;

selecting a standby central arbiter different from said active central arbiter;

communicating the active status of said active central arbiter;

communicating the standby status of said standby central arbiter;

receiving at said active central arbiter requests to pass chunks of data through an optical switching fabric;

at said active central arbiter in response to said requests concurrently issuing grants to pass said chunks and issuing optical switch configuration information corresponding to said grants, such that each said chunk passes during a single chunk period;

at said standby central arbiter periodically receiving keep-alive requests;

at said standby central arbiter concurrently issuing keep-alive grants and standby configuration information in response to said keep-alive requests; and interchanging said active and standby status of said respective active and standby central arbiters, such that said standby central arbiter becomes a new active central arbiter and said active central arbiter becomes a new standby central arbiter;

wherein decisions of said selecting and said interchanging are initiated by a control processor selected from the group consisting of a master control processor (MCP) and shelf control processors, wherein said communicating of said active status occurs simultaneously from said active central arbiter to an optical switch ASIC and to a plurality of ingress ASICs; and said communicating of said standby status occurs simultaneously from said standby central arbiter to an optical switch ASIC and to a plurality of ingress ASICs, wherein said issuing grants and said issuing corresponding switch configuration information both occur within the same chunk period, wherein said issuing keep-alive grants and said issuing standby configuration information both occur within the same chunk period, wherein said requests received by said active central arbiter are issued from a plurality of ingress ASICs through first multiple links, wherein said grants issued by said active central arbiter are received by said plurality of ingress ASICs through said first multiple links, and wherein, if a grant is not received by said ingress ASIC within a predetermined timeout period after the corresponding request was issued, then said ingress ASIC resets an internal outstanding request queue as well as request queues in said active central arbiter, until the respective queues of both said ingress ASIC and said active central arbiter are emptied of all outstanding requests, such that said ingress ASIC and said active central arbiter are synchronized in an empty state.

2. The method of claim 1 wherein said selecting and said interchanging are performed by writing a CSR to said respective active and standby central arbiters.

3. The method of claim 1 wherein no traffic in said router system is dropped.

4. The method of claim 3 wherein traffic in said router system is delayed no longer than six chunk periods.

5. A method of protection switching of redundant central arbiters in a router system, comprising:

selecting an active central arbiter;

selecting a standby central arbiter different from said active central arbiter;

communicating the active status of said active central arbiter;

communicating the standby status of said standby central arbiter;

receiving at said active central arbiter requests to pass chunks of data through an optical switching fabric;

at said active central arbiter in response to said requests concurrently issuing grants to pass said chunks and issuing optical switch configuration information corresponding to said grants, such that each said chunk passes during a single chunk period;

at said standby central arbiter periodically receiving keep-alive requests;

at said standby central arbiter concurrently issuing keep-alive grants and standby configuration information in response to said keep-alive requests;

interchanging said active and standby status of said respective active and standby central arbiters, such that said standby central arbiter becomes a new active central arbiter and said active central arbiter becomes a new standby central arbiter;

wherein decisions of said selecting and said interchanging are initiated by a control processor selected from the group consisting of a master control processor (MCP) and shelf control processors, wherein:

said communicating of said active status occurs simultaneously from said active central arbiter to an optical switch ASIC and to a plurality of ingress ASICs; and said communicating of said standby status occurs simultaneously from said standby central arbiter to an optical switch ASIC and to a plurality of ingress ASICs, wherein said issuing grants and said issuing corresponding switch configuration information both occur within the same chunk period, wherein said issuing keep-alive grants and said issuing standby configuration information both occur within the same chunk period, wherein said requests received by said active central arbiter are issued from a plurality of ingress ASICs through first multiple links, wherein said grants issued by said active central arbiter are received by said plurality of ingress ASICs through said first multiple links, wherein said optical switch configuration information is issued by said active central arbiter to said optical switching fabric through second multiple links differing from said first multiple links, wherein said optical switch configuration information is issued by an active central arbiter ASIC in said active central arbiter to an optical switch ASIC in said optical switching fabric, wherein said keep-alive requests received by said standby central arbiter are issued from a plurality of ingress ASICs through third multiple links differing from said first and second multiple links, wherein said keep-alive grants issued by said standby central arbiter are received by said plurality of ingress ASICs through said third multiple links differing from said first and second multiple links, wherein said standby configuration information is issued by said standby central arbiter to said optical switching fabric through fourth multiple links differing from said first, second, and third multiple links, wherein said standby configuration information is issued by a standby central arbiter ASIC in said standby central arbiter to an optical switch ASIC in said optical switching fabric, wherein the issuing of said keep-alive requests and the receiving of said keep-alive grants by said ingress ASICs is performed cyclically;

encoding grants, requests, keep-alive grants, keep-alive requests, optical switch configuration information, standby configuration information, and active or standby status communication messages with error detection codes;

sending said grants, requests, keep-alive grants, keep-alive requests, optical switch configuration information, standby configuration information, and arbiter active or standby status bit messages with error detection codes to destinations through multiple links selected from the group consisting of said first, second, third, and fourth multiple links;

within each chunk period at said destinations receiving said messages and decoding said error detection codes to determine a healthy or weak state of said multiple links; and within each chunk period intercomparing said determinations among a plurality of said destinations to decide whether to interchange the active or standby status of said central arbiters.

6. The method of claim 5 wherein said error detection codes comprise a cyclical redundancy check (CRC).

7. The method of claim 5 wherein said destinations comprise said ingress ASICs, said active arbiter ASIC, said standby arbiter ASIC, and said optical switch ASICs.

8. The method of claim 7 wherein:
if said destination decodes as error-free a message received through a said multiple link, then said multiple link is determined to be healthy, and said destination decodes an
arbiter active or standby status bit received through said healthy link; otherwise
said destination determines said multiple link to be weak, and said destination does not decode an arbiter active or standby status bit received through said weak link.

9. The method of claim 8 further comprising:
if at said ingress ASIC, said first and said third multiple links are both determined to have the same healthy link state and report the same active or standby arbiter status; and
at said optical switch ASIC, said second and said fourth multiple links are both determined to have the same healthy link state and report the same active or standby arbiter status; then
said ingress ASIC and said optical switch ASIC intercompare said determinations and decide not to interchange said active or standby arbiter status; otherwise
if at said ingress ASIC only one of said first and said third multiple links is determined to have both a healthy link state and active reported arbiter status, and at said optical switch ASIC only one of said second and fourth multiple links is determined to have both a healthy link state and active reported arbiter status, then said ingress ASIC and said optical switch ASIC intercompare said determinations and recognize as active the link reporting active arbiter status; otherwise
if at said ingress ASIC only one of said first and said third multiple links is determined to have both a healthy link state and standby reported arbiter status, and at said optical switch ASIC only one of said second and fourth multiple links is determined to have both a healthy link state and standby reported arbiter status, then said ingress ASIC and said optical switch ASIC intercompare said determinations, recognize as active the link not reporting standby arbiter status, and request said control processor (CP) to initiate an interchange of active or standby arbiter status.

10. The method of claim 9 wherein said interchanging said active and standby status of said respective active and standby central arbiters comprises:
setting by said CP the active or standby status bit of said active central arbiter from active to standby status;
setting by said CP the active or standby status bit of said standby central arbiter from standby to active status;
communicating said setting of each of said active or standby bits by each of said respective central arbiters simultaneously to said ingress ASICs and said optical switch ASICs;
in response to said communicating, resetting by said ingress ASICs of internal outstanding request queues of said ingress ASICs and of request queues in said active and standby central arbiters, until the respective queues of both said ingress ASIC and said active and standby central arbiters are emptied of all outstanding requests, such that said ingress ASICs and said arbiters are synchronized in an empty state; and
proceeding with normal operation, such that no traffic in said router system is dropped.

11. The method of claim 10, wherein said interchanging is initiated by said CP following an occurrence selected from the group consisting of failure to receive a grant within a specified period after issuing a corresponding request, failure at a destination to receive an error-free message through any one of said first, second, third, and fourth multiple links, and scheduling of maintenance involving one of said central arbiters.

12. A communication network router incorporating a system for central arbitration protection, said system comprising:
redundant interchangeable central arbiters including an active central arbiter and a standby central arbiter;
a plurality of control processors including a master control processor and distributed control processors, said control processors being interconnected with one another and with said redundant central arbiters through a control network;
a plurality of ingress ASICs interconnected through first multiple links with said active central arbiter and through third multiple links with said standby central arbiter;
an optical switching fabric containing an optical switch ASIC interconnected through second multiple links with said active central arbiter and through fourth multiple links with said standby central arbiter;
said standby central arbiter configured to receive keep-alive requests and send keep-alive grants cyclically through said third multiple links, and to send standby configuration information through said fourth multiple links in response to said keep-alive requests;
said redundant central arbiters being configured to interchange in response to a switch over decision from said plurality of control processors, such that said standby central arbiter becomes a new active central arbiter and said active central arbiter becomes a new standby central arbiter, such that said ingress ASICs reset request queues within said ingress ASICs and within said redundant central arbiters, and such that the active and standby status of respective redundant central arbiters is communicated through said first through said fourth multiple links; and
said ingress ASICs and said optical switch ASICs being configured to cooperatively determine a healthy or weak state of each of respective first through fourth multiple links and said active and standby status of said respective redundant central arbiters.

* * * * *